(12) United States Patent
Lozano Bonet

(10) Patent No.: US 11,331,711 B2
(45) Date of Patent: May 17, 2022

(54) METHOD FOR OPERATING A FINE BLANKING SYSTEM

(71) Applicant: Lapmaster Wolters GmbH, Rendsburg (DE)

(72) Inventor: Jose Lozano Bonet, Rendsburg (DE)

(73) Assignee: Lapmaster Wolters GmbH, Rendsburg (DE)

( * ) Notice: Subject to any disclaimer, the term of this patent is extended or adjusted under 35 U.S.C. 154(b) by 202 days.

(21) Appl. No.: 16/850,633

(22) Filed: Apr. 16, 2020

(65) Prior Publication Data

US 2020/0331052 A1 Oct. 22, 2020

(30) Foreign Application Priority Data

Apr. 18, 2019 (EP) ..................................... 19170099

(51) Int. Cl.
*B21D 28/26* (2006.01)
*B21D 28/00* (2006.01)
*B21D 28/16* (2006.01)
*B30B 15/16* (2006.01)
*B30B 15/26* (2006.01)

(52) U.S. Cl.
CPC ........... *B21D 28/26* (2013.01); *B21D 28/002* (2013.01); *B21D 28/16* (2013.01); *B30B 15/16* (2013.01); *B30B 15/26* (2013.01)

(58) Field of Classification Search
CPC ....... B30B 15/16; B30B 15/26; B30B 15/061; B21D 28/002; B21D 28/02; B21D 28/04; B21D 28/16; B21D 55/00
USPC ....................... 72/20.1, 20.2, 20.3, 21.1, 21.6
See application file for complete search history.

(56) References Cited

U.S. PATENT DOCUMENTS

| | | | | |
|---|---|---|---|---|
| 5,119,311 A | * | 6/1992 | Gold | ................... B30B 15/0094 700/206 |
| 5,311,759 A | * | 5/1994 | Mangrulkar | .......... G01L 5/0076 72/3 |
| 5,448,902 A | | 9/1995 | Thoms et al. | |
| 5,450,347 A | * | 9/1995 | Thoms | ................... B21D 22/22 700/146 |
| 5,526,738 A | * | 6/1996 | Logan | ..................... B30B 15/16 100/270 |
| 5,586,041 A | | 12/1996 | Mangrulkar | |

(Continued)

FOREIGN PATENT DOCUMENTS

CN 104467556 A 3/2015
EP 1815972 A2 8/2007

(Continued)

*Primary Examiner* — Gregory D Swiatocha
*Assistant Examiner* — Bobby Yeonjin Kim
(74) *Attorney, Agent, or Firm* — Barclay Damon LLP

(57) ABSTRACT

A method for operating a fine blanking system comprises at least one fine blanking press having a first press unit, a second press unit, and one or more sensors. The method comprises obtaining parameter data from the one or more sensors for at least one of the first press unit, the second press unit, and another component of the fine blanking system during a first fine blanking process step. Adjustments are determined for control parameters of at least one of the first press unit, the second press unit, and the other component based on the parameter data. The adjustments are applied to the control parameters in a second fine blanking process step subsequent to the first fine blanking process step.

18 Claims, 2 Drawing Sheets

(56) References Cited

U.S. PATENT DOCUMENTS

| | | | | |
|---|---|---|---|---|
| 6,751,572 B1* | 6/2004 | Modesto | ............... | B21D 5/00 |
| | | | | 702/155 |
| 7,559,133 B2* | 7/2009 | Chitty | ............... | B21J 15/285 |
| | | | | 72/21.1 |
| 9,073,112 B2* | 7/2015 | Cole | ............... | B21D 22/20 |
| 2007/0012171 A1* | 1/2007 | Schmidt | ............... | F15B 11/024 |
| | | | | 91/6 |
| 2007/0240470 A1* | 10/2007 | Suzuki | ............... | B21D 22/20 |
| | | | | 72/14.9 |
| 2012/0272839 A1 | 11/2012 | Kaneko | | |
| 2017/0008186 A1* | 1/2017 | Honegger | ............... | B30B 15/32 |
| 2019/0322065 A1* | 10/2019 | Sarban | ............... | B30B 15/0094 |
| 2020/0114608 A1* | 4/2020 | Harada | ............... | G06N 20/00 |

FOREIGN PATENT DOCUMENTS

| | | |
|---|---|---|
| EP | 2158982 A1 | 3/2010 |
| EP | 3115191 A1 | 1/2017 |
| JP | 2009-006385 | 1/2009 |

\* cited by examiner

METHOD FOR OPERATING A FINE BLANKING SYSTEM

CROSS REFERENCE TO RELATED INVENTION

This application is based upon and claims priority to, under relevant sections of 35 U.S.C. § 119, European Patent Application No. 19 170 099.6, filed Apr. 18, 2019, the entire contents of which are hereby incorporated by reference.

BACKGROUND

The invention pertains to a method for operating a fine blanking system comprising at least one fine blanking press comprising at least one first press unit and at least one second press unit. The fine blanking system further comprises at least one first press drive for driving the at least one first press unit in a first driving movement against the at least one second press unit during a fine blanking process step.

Fine blanking presses allow blanking parts for example from sheet metal with high quality and flexibility with regard to the design of the parts. Fine blanking presses usually comprise a press ram and a counter unit, such as a working table, arranged opposite the press ram. A blanking tool is arranged between the blanking ram and the working table. The blanking tool can comprise for example one or more press plates or ejectors directly connected by transfer pins to a press cushion of the press ram or a press cushion of the working table or connected to any other cushion or actuator integrated inside the tool itself, as well as one or more press punches or press dies. During a fine blanking process step the press ram is driven in a driving movement against the working table wherein sheet metal to be processed is held between the press ram and the working table. During the fine blanking process step the press ram pushes the working table along its driving direction. During the fine blanking process step the press ram can move relative to press plates or press punches, press dies or others. For blanking a part from the process material for example press punches can move relative to the press ram. Usually, the blanking tool is provided with impingement means, for example an impingement ring, like a V-ring, for securely holding the process material in place. The fine blanking process can also comprise progressive, transfer, rotary or other tooling process steps, wherein a part is blanked performing subsequent movements of press ram and working table. Fine blanking presses are known for example from EP 2 158 982 A1 or EP 3 115 191 A1.

The press ram exerting the main blanking force can for example be driven by a hydraulic cylinder. During its driving movement the press ram can drive other press units, such as cushions. The cushions can also be provided with a hydraulic cylinder which may be actuated by the movement of the press ram. In known fine blanking presses accumulators, such as gas cylinders filled with for example nitrogen, are provided, wherein an actuation of the hydraulic cylinder of the cushion during the driving movement of the press ram compresses the gas in the accumulator. In this way part of the energy applied during the fine blanking process can be collected and used for the next press cycle. This makes the fine blanking press energy efficient.

When setting up a fine blanking system with at least one fine blanking press many standard components are used as well as specific components, wherein usually a plurality of adjustments have to be applied to at least some of the components. Many of the components are in movement during production cycles and a complete fine blanking press life. The fine blanking system is thus highly individualized such that setting up optimum production parameters, which is carried out manually, is tedious and complex and thus time-consuming as well as costly. In particular, all components of the fine blanking press system need to be adjusted with regard to their interaction with the other components to achieve the optimum processing result. In addition, the component's state and thus behaviour changes over time, for example due to wear or age. This in turn necessitates further manual adjustments of the process parameters over time. In fact, even the same components from the same suppliers will somewhat differ with regard to their performance behaviour.

BRIEF SUMMARY OF THE INVENTION

Starting from the above explained prior art it is an object of the invention to provide a method of the above explained type wherein set up of the system components can be simplified over the entire production process.

The invention solves the object with a method for operating a fine blanking system comprising at least one fine blanking press comprising at least one first press unit and at least one second press unit. The blanking press further comprises at least one first press drive for driving the at least one first press unit in a first driving movement against the at least one second press unit during a fine blanking process step. One or more sensors are arranged to collect parameter data from the at least one first press unit and/or the at least one second press unit and/or from other components of the fine blanking system. The method comprises collecting parameter data with the one or more sensors from the at least one first press unit and/or the at least one second press unit and/or from other components of the fine blanking system during a first fine blanking process step. Adjustments are determined for control parameters of the at least one first press unit and/or the at least one second press unit and/or of other components of the fine blanking system based on the collected parameter data. The adjustments are applied to the control parameters of the at least one first press unit and/or the at least one second press unit and/or of other components of the fine blanking system in a second fine blanking process step subsequent to the first fine blanking process step.

In an embodiment, a fine blanking press of the fine blanking system used in the inventive method comprises one or more first press units, such as one or more press rams, one or more press cushions and/or one or more chopping units and/or others, and one or more second press units, such as one or more press counter rams, one or more working tables, one or more press cushions and/or one or more press plates, and/or others. Opposite the first press unit, for example such as a press ram, for example a working table can be arranged. A press drive drives the first press unit, such as a press ram exerting the main blanking force, along a first driving movement or stroke during a fine blanking process step. The first press unit may carry out different movements, for example a first fast approaching movement, a second blanking or cutting movement and a third return movement. Additional movements with different movement speeds may be introduced for example in between the explained movements. The process material, for example sheet metal, is clamped by means of a fine blanking tool arranged between for example the press ram and a working table arranged opposite the press ram. The fine blanking tool serves to blank parts out of the process material fed to the process zone between the press ram and the working table, and can comprise one or more press punches, dies or other components. For example, in the press two or more cushions can be arranged opposite each other. One of the cushions can comprise impingement means, such as an impingement ring, like a V-shaped ring (V-ring), for securely holding the process material during the blanking process. Press punches movable relative to the cushions can be provided for blanking parts out of the process material. A feeding device of the fine blanking press feeds the process material to be processed into the process zone between the press ram and the working table. The process material is typically sheet metal. It can be present as a coil that is unwound from a reel and fed flat to the process zone, where it is blanked by the blanking tool.

In an embodiment, the fine blanking system used in the inventive method may comprise more than one fine blanking presses. The at least one first press unit and/or the at least one second press unit may comprise, but are not limited to, press rams, working tables, press cushions, press plates and/or chopping units. The other components of the fine blanking system may comprise, but are not limited to, press frame components, control valves, hydraulic fluid conduits, power units, feeding devices, straightening devices, levelling devices, grinding devices, heat treatment devices, surface treatment devices, press devices, fine blanking presses, parts feeding devices, deburring devices, washing devices, tumbler devices, assembling devices, robots devices, handling devices, packaging devices, labelling devices and/or quality inspection devices.

In an embodiment, the invention is based on the idea that each individual fine blanking system and each individual fine blanking press and each other component of the fine blanking system have an individual performance pattern, a so-called fingerprint. According to the invention one or more sensors are used for measuring parameter data for at least some components of the fine blanking system. This collected parameter data provides the specific fingerprints of the components of the fine blanking system. According to the teaching of the invention, parameter data is collected with the sensors for the respective components during a first fine blanking process step. On this basis it is decided whether and which adjustments are beneficial for the production process. These adjustments are then applied in a second fine blanking process step subsequent to the first fine blanking process step in order to adjust and improve the production process as necessary, and taking into consideration the specific fingerprint data obtained with the one more sensors. The second fine blanking process step can directly follow the first fine blanking process step or there may be additional fine blanking process steps between the first and second fine blanking process step. According to the invention on basis of the parameter data collected by the sensors adjustments to control parameters of components of the fine blanking system are determined and applied. The collected parameters and the control parameters need not be the same parameters. For the adjustment of the control parameters it is possible to influence the collected parameters of a measured component through control of one or more different components, for example suitable actuators. The control parameters can then be control parameters of the different components, such as the actuators. By adjusting the control parameters of the one or more different components the collected parameters of the measured component are influenced in the desired manner. It is also possible that the control parameters and the collected parameters are the same parameters of the same component, which are then directly adjusted in the determined manner.

In an embodiment, the method identifies for example deviations of performance parameters of certain components from expected (standard) performance parameters of these components and to adapt parameters of the components in a desired manner, for example to the expected standard performance parameters. As will be explained in more detail below it is also possible according to the invention to detect and compensate for changes of the collected parameters of certain components over time, for example due to wear or age. Furthermore, it is easily possible to adjust the fine blanking system to different production conditions, for example a different product to be processed. The inventive method thereby allows for a simple and automatic setup of the fine blanking system to optimum production parameters irrespective of individual component's performance behaviour. As will also be explained in more detail below it is in particular possible to have a control unit receive the sensor measurement data and automatically determine and apply the desired adjustments. Complex and tedious manual setups can thus be avoided.

As already mentioned there may be a number of different so-called fingerprints characterizing different parts of the fine blanking system. First of all, every single component of the fine blanking system will have a component fingerprint. The components together making up the fine blanking press will then together have a fine blanking press fingerprint, only relating to the fine blanking press. The further components of the fine blanking system will again each have a component fingerprint, and together with the fine blanking press fingerprint constitute a fine blanking system fingerprint. The components of the fine blanking system may in particular also include peripheral equipment, for example other presses, potentially fine blanking presses or of another type, heat treatment machines, surface treatment machinery, parts feeding systems, grinding machines and so forth, as mentioned above. As also mentioned above, it is possible to integrate all of the sensor measurements as well as determination and application of adjustments with a central control unit, thus leading to an integrated fine blanking process fingerprint method. The inventive method can be carried out for example at certain time intervals or for example at every single fine blanking press step or cycle to ensure fast reaction times. The inventive methods can be initiated automatically, for example by the control unit.

According to a further embodiment, the one or more sensors may comprise position sensors, pressure sensors, fluid and/or gas flow sensors, viscosity sensors, sound sensors, temperature sensors, velocity sensors, acceleration sensors, stroke sensors, force sensors, vibration sensors, frequency sensors, cleanliness sensors and/or deformation sensors. Generally, any type of suitable sensor for determining relevant parameter data may be used. Also, additional sensors to the ones mentioned above may be utilized.

According to a further embodiment, it is possible that the parameter data from the at least one first press unit and/or the at least one second press unit and/or from the other components of the fine blanking system are collected with the sensors during a multitude of, preferably all of, subsequent fine blanking process steps following the first fine blanking process step. In an embodiment, the adjustments are determined for control parameters of the at least one first press unit and/or the at least one second press unit and/or of the other components of the fine blanking system based on the collected parameter data for fine blanking process steps following each of the multitude of subsequent fine blanking process steps. The adjustments to the control parameters of the at least one first press unit and/or the at least one second press unit and/or of the other components of the fine blanking system are applied in the fine blanking process steps following the subsequent fine blanking process steps.

The determination of the adjustments for a subsequent fine blanking process step may be based on a comparison of the collected parameter data for the current fine blanking process step with the collected parameter data for at least one previous fine blanking process step.

According to the above embodiments, an ongoing adjustment of the parameter data is possible, for example for all fine blanking process steps, or for certain fine blanking process steps, e.g. at certain time intervals. Again, the adjustments can be applied in all fine blanking process steps following the subsequent fine blanking process step or in at least some of the fine blanking process steps following the subsequent fine blanking process steps. With the above embodiments, a particularly precise adjustment, taking into consideration changes in the components' behaviour over time, is possible.

According to a further embodiment, the determination of the adjustments for a subsequent fine blanking process step is based on a comparison of the collected parameter data for the current fine blanking process step with the collected parameter data for the first fine blanking process step and the collected parameter data for at least one previous fine blanking process step. It may in particular be compared with the collected parameter data for a plurality of, or all of the previous fine blanking process steps. In this manner the data range is further increased such that the determination of adjustments can be more precise and data trends can be identified and considered.

According to a further embodiment, the determination of the adjustments of the parameter data may be based on an identification of at least one trend in the collected parameter data, wherein for determining at least one adjustment of control parameters the identified trend is predicted for at least one subsequent fine blanking process step. According to this embodiment, a change over time of the parameter data is identified as a trend. For example, such a trend could be an increase in a necessary cutting force of a press component over time. This trend is predicted further for future processing steps based on the finding that the increase in cutting force may for example be due to wear or age of the particular press or tool component. In this manner it is possible to implement a predictive monitoring system reacting in an anticipatory manner to likely future changes of the parameter data. For example, in this way it is possible to predict future component failures or normal component wear, and consequently a production lifetime of components, thereby enhancing the fine blanking press capacity to ensure a safe production eliminating press downtimes and reducing the risk of faulty produced parts. As will be further explained below, it is also possible to issue a warning signal to operator personnel on this basis or even to stop production of the fine blanking system, all this potentially automatically initiated by a control unit.

According to a further embodiment, the determination and application of the adjustments of the parameter data may be conducted in a closed loop control by a control unit. The control unit may then receive the parameter data collected by the sensors in real time. In this manner a real time closed loop control of the adjustments is possible and thus a fast and fully automated adjustment process.

According to a further embodiment, the collected parameter data and/or the determined adjustments of the control parameters may be stored in a main database, preferably for output to operator personnel. Based on the collected parameter data and/or the determined adjustments of the control parameters, a warning signal may further be generated for operator personnel, and preferably a warning signal indicating or current and/or predicted future failure or wear of the at least one first press unit and/or the at least one second press unit and/or other components of the fine blanking system. This embodiment thus relates to the above explained active and predictive maintenance monitoring.

The adjustments of the parameter data comprise, but are not limited to, adjustments to the velocity, acceleration, exerted force, start and/or end time of movement and/or moving direction of the at least one first press unit and/or the at least one second press unit. Furthermore, the adjustments of the parameter data may comprise, but are not limited to, adjustments to the production speed and/or to the start and/or end time of production of at least one fine blanking press and/or at least one other component of the fine blanking system.

According to a further embodiment, it is possible that the at least one first press drive comprises at least one first hydraulic cylinder, and in that at least one first control valve is provided which can connect the barrel side and/or the piston side of the at least one first hydraulic cylinder to a tank for hydraulic fluid and/or which can connect the barrel side and the piston side of the at least one first hydraulic cylinder to each other. The control valve may preferably be a proportional control valve. The control valve may be controlled by a control unit of the fine blanking system. The hydraulic fluid may, for example, be oil. The connection of the hydraulic cylinder to the hydraulic fluid tank is effected according to the control status of the control valve, in particular the flow volume it lets pass to the tank according to its control of the controller. Of course, other control systems would also be possible. The barrel side and the piston side may be pressurized before (and during) a first driving movement of a first press unit, in particular at all times during the first driving movement of the first press unit. By pressurizing the barrel side and the piston side already before the first driving movement of the first press unit a counter force acts before any movement of the first press unit. By pressurizing the cylinder cavities at all time the position of the first press unit along the complete movement is maintained and controlled with very high accuracy since the compressibility ratio of the hydraulic fluid is already compensated. This also allows faster reactions of the press unit movements. The barrel side and the piston side may further be connected to each other by the control valve, in particular at all times during the first driving movement of the first press unit. According to a further embodiment the pressure in the barrel side and the piston side of the at least one first hydraulic cylinder may be one of the adjusted control parameters.

The at least one second press unit may be driven in a second driving movement at least partially by the first driving movement of the at least one first press unit. For example, the second press unit could be a press cushion and the first press unit could be a press ram, as already explained.

According to a further embodiment, the at least one second press unit may exert a counter force against the at least one first press unit during at least a part of its first driving movement. This counter force may be generated by the second press unit, in particular a second press drive of the second press unit. However, this counter force may also be generated by the first press unit itself, for example by pressurizing a cylinder cavity of a hydraulic cylinder of the first press drive acting against the first driving movement. Through this counter force the first press unit is loaded between the driving force of the first press drive driving the first press unit in the first driving movement and the counter force acting against this driving force. This loading allows for a very fast and precise control of the movement of the first press unit. The counter force may already be applied before the first press unit starts its first driving movement. The counter force may be one of the adjusted control parameters according to the invention.

According to a further embodiment, it is possible that the at least one second press unit comprises at least one second press drive comprising at least one hydraulic cylinder, and in that at least one second control valve is provided which can connect the barrel side and/or the piston side of the at least one second hydraulic cylinder to a tank for hydraulic fluid and/or which can connect the barrel side and the piston side of the at least one second hydraulic cylinder to each other. The pressure in the barrel side and the piston side of the at least one second hydraulic cylinder may be one of the adjusted control parameters according to the invention.

According to a further embodiment, it is possible that before the first fine blanking process step at least one initial fine blanking process step is carried out without material to be fine blanked fed to the at least one fine blanking press, in which at least one initial fine blanking process step parameter data with the sensors from the at least one first press unit and/or the at least one second press unit and/or from other components of the fine blanking system is collected. Adjustments are determined for control parameters of the at least one first press unit and/or the at least one second press unit and/or of other components of the fine blanking system based on the collected parameter data, and the adjustments to the control parameters of the at least one first press unit and/or the at least one second press unit and/or of other components of the fine blanking system are applied in at least the first fine blanking process step.

It is also possible that before the first fine blanking process step several initial fine blanking process steps are carried out without material to be fine blanked fed to the at least one fine blanking press, in which initial fine blanking process steps parameter data with the sensors from the at least one first press unit and/or the at least one second press unit and/or from other components of the fine blanking system is collected. From the data collected with the sensors, a mean data value is calculated for each sensor, and the mean data value is taken into account when determining adjustments for control parameters in subsequent fine blanking process steps.

According to the above embodiments, a start-up procedure for the fine blanking system is implemented wherein at least one process step without blanking material fed to the fine blanking system, in particular the fine blanking press, is carried out. In this way the behaviour, i.e. fingerprint, of the fine blanking system can be determined without influences of the blanking material. When carrying out fine blanking process steps without material to be fine blanked fed to the at least one fine blanking press it is possible for example to determine delay times of communication between components and the control unit or of reaction times of for example actuators. On this basis corresponding corrective adjustments of control parameters can be set and applied in subsequent fine blanking process steps. By storing collected parameter data in a main database repeatability for future processes can be improved.

BRIEF DESCRIPTION OF THE DRAWINGS

Embodiments of the invention are explained in more detail in the following by reference to schematic drawings.

In the drawings the same reference numerals refer to identical or functionally identical parts.

DETAILED DESCRIPTION OF THE INVENTION

Figure 1:
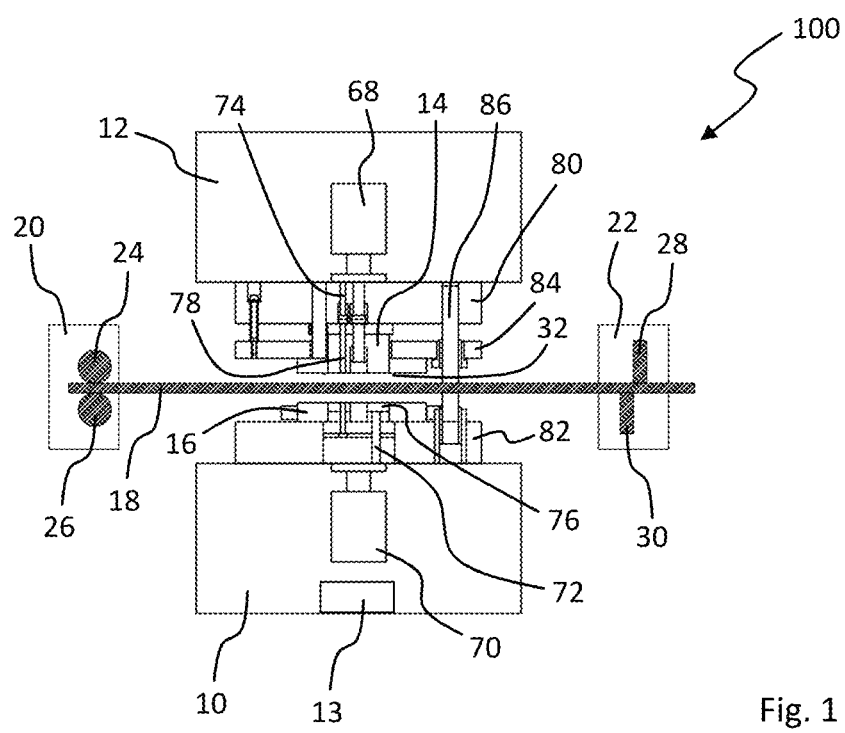
FIG. 1 illustrates a plan view of an embodiment of a fine blanking press.

The fine blanking press 100 shown in FIG. 1 is an example of a fine blanking press which can be used with the inventive method. Of course also other fine blanking presses could be used in the inventive method. The fine blanking press shown in FIG. 1 comprises a press ram 10, constituting a first press unit, and a working table 12 arranged opposite the blanking ram 10. A first press drive shown very schematically at 13 is provided for driving the press ram 10 in a first driving movement during a fine blanking process step, in FIG. 1 upwards and downwards. Integrated into the press ram 10 and the working table 12 are cushions 68, 70, which are connected to a blanking tool arranged between the press ram 10 and the working table 12 through transfer pins 72, 74. The blanking tool further comprises press punch 14, which may be positionally fixed together with the working table 12, and die 16, which moves together with the press ram 10. The blanking tool further comprises ejectors 76, 78, set plates 80, 82, press plate 84 and a tool guiding 86. Punch 14 and die 16 blank parts out of a sheet metal 18 fed to the process zone between the press ram 10 and the working table 12 by a feeding unit 20, in the example shown in FIG. 1 in a direction from left to right. A chopping unit 22 is provided downstream of the process zone for chopping scrap process material after the fine blanking process. In the shown example the feeding unit 20 comprises two rotationally driven feeding rollers 24, 26 arranged on opposite sides of the process material 18. Of course, also other feeding units are possible, for example gripper feeders or other feeders. The chopping unit 22 comprises axially driven cutters 28, 30 arranged on opposite sides of the process material 18 for chopping the scrap process material. An impingement ring 32, like a V-ring, is further shown schematically for securely holding the process material 18 during the fine blanking process. The impingement ring 32 may in particular be provided on the press plate 84 of the blanking tool driven by one of the cushions. This general design of a fine blanking press is known to the skilled person and shall not be explained in more detail.

FIG. 1 shows the open condition of the fine blanking press in which the process material 18 can be fed into the process zone. Subsequently, the press ram 10 can be moved upwards against the working table 12. The process material 18 is thus clamped by the blanking tool between the press ram 10 and the working table 12 and securely held in place by the impingement ring 32. Subsequently, the press ram 10 can be further driven against the working table 12, punch 14 and die 16 thus blanking a part out of the process material 18. The working table 12 may exert a counter force against the press drive of the blanking ram 10, for example through a cushion, in particular for clamping the impingement ring 32 into the process material 18 to improve clamping of the process material 18. After the explained movements the press ram 10 can be moved downwards and the fine blanking press is opened again to eject the produced part. This operation of a fine blanking press is also generally known to the skilled person.

Figure 2:
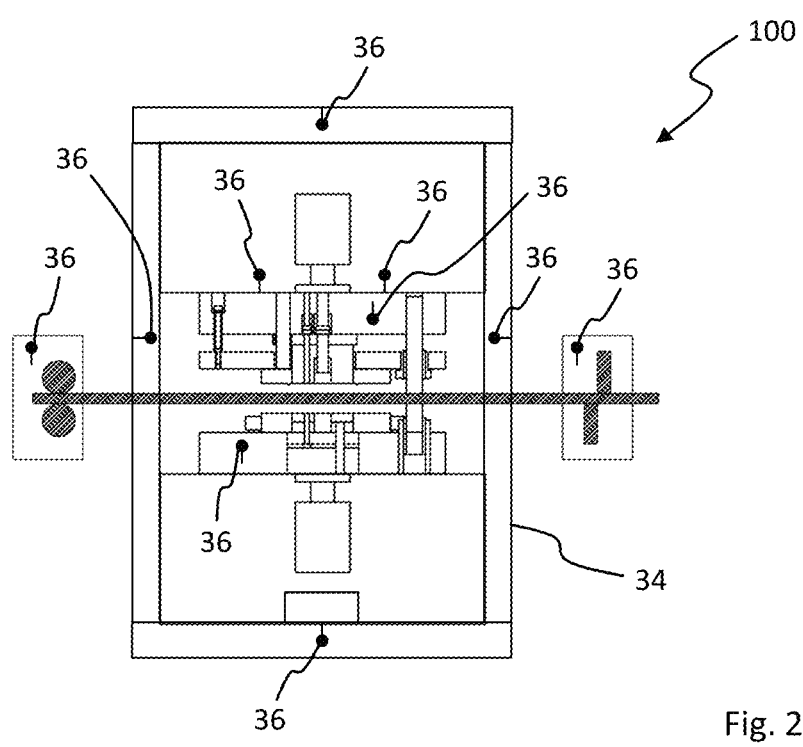
FIG. 2 illustrates another plan view of the fine blanking press of FIG. 1 including a press frame and a plurality of sensors.

In FIG. 2 the fine blanking press 100 of FIG. 1 is shown with its press frame 34 which is not shown in FIG. 1 for visualization purposes. Furthermore, in FIG. 2 a number of sensors 36 are shown which are positioned at different locations of the fine blanking press. The sensors 36 may for example comprise, but are not limited to, position sensors, pressure sensors, fluid and/or gas flow sensors, viscosity sensors, sound sensors, temperature sensors, velocity sensors, acceleration sensors, stroke sensors, force sensors, vibration sensors, frequency sensors, cleanliness sensors and/or deformation sensors.

The sensors 36 collect parameter data for the components they are attached to. For example, the sensors 36 attached to the press frame 34 can be deformation sensors which measure a deformation of the press frame 34 during a fine blanking process step and so forth. The sensors 36 may be connected to a central control unit 38 of the fine blanking system shown in FIG. 4. The control unit 38 receives the measurement data from the sensors 36. On this basis, the control unit 38 can determine adjustments for control parameters of the particular components the sensors 36 are attached to and apply the adjustments to the control parameters accordingly. To this end the control unit 38 can carry out a closed loop control based on real time measurement data from the sensors 36. As will be explained below the further components of the fine blanking system shown in FIG. 4 may also be provided with corresponding sensors 36 which may in the same way be connected to the control unit 38 such that the control unit 38 can also for these further components determine adjustments and apply adjustments to corresponding control parameters in the explained manner. The control unit 38 can also comprise a main database in which measurement data from the sensors 36 and/or determined and/or apply adjustments to control parameters can be stored for example for future evaluations.

Figure 3:
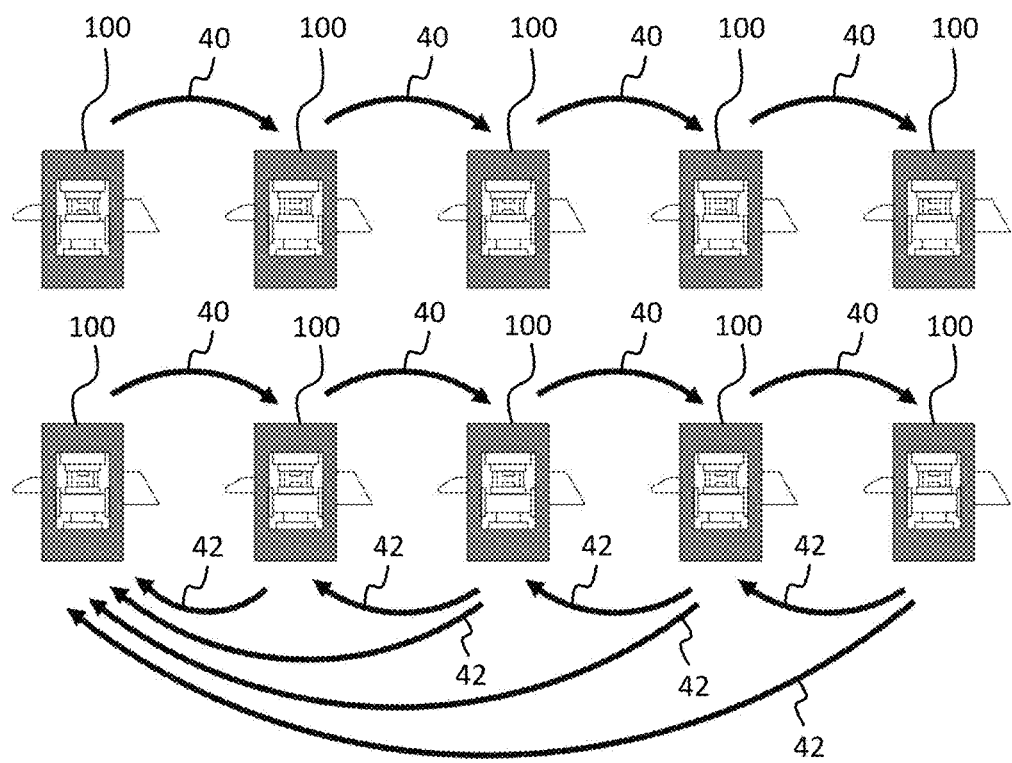
FIG. 3 illustrates a schematic depiction of two embodiments of operating the fine blanking press of FIG. 1.

In the upper part of FIG. 3 it is visualized by arrows 40 how the inventive method can be carried out for five subsequent fine blanking process steps with the fine blanking press 100. In the upper part of FIG. 3 for example parameter data can be collected by the sensors 36 without feeding material to be fine blanked to the fine blanking press 100. On basis of the collected parameter data the control unit 38 can determine and apply adjustments to control parameters of the components of the fine blanking press 100 in the subsequent fine blanking process step(s). From the collected parameter data for each of the process steps in the upper part of FIG. 3 mean values of the parameter data can be obtained and can be used for determining and applying adjustments to the fine blanking press 100 for subsequent process steps with material to be blanked fed to the fine blanking press 100. Also, maximum and minimum values for the parameter data can be determined and used for evaluations. Of course some or all of the process steps shown in the upper part of FIG. 3 could also be carried out with material to be blanked fed to the fine blanking press 100.

In the lower part of FIG. 3 an embodiment of the inventive method is shown where besides the above explained determination and application of adjustments for subsequent process steps according to arrows 40 comparisons between parameter data collected for a particular fine blanking process step with parameter data collected for one or several or all of the previous fine blanking process steps is carried out in particular by the control unit 38, as visualized in FIG. 3 by arrows 42. On this basis a more precise determination of the necessary adjustments is possible. For example, wear of components can be detected and considered. In the lower part of FIG. 3 all or at least some of the process steps can be carried out with material to be blanked fed to the fine blanking press 100.

Figure 4:
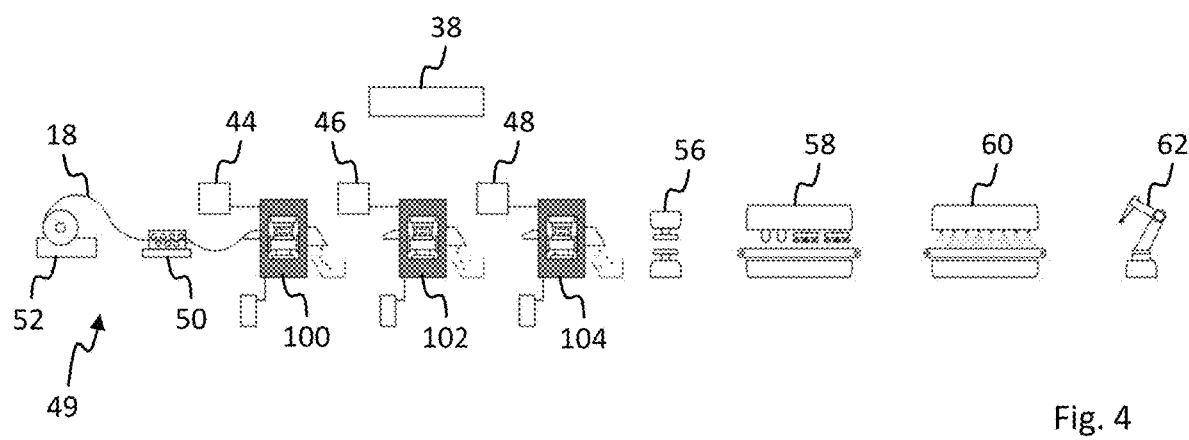
FIG. 4 illustrates a schematic depiction of a fine blanking system.

In FIG. 4 a fine blanking system used in the inventive method is shown including fine blanking press 100 as a master fine blanking press. The fine blanking system further comprises a second slave fine blanking press 102 and a slave conventional press 104. Each of the presses 100, 102 and 104 may comprise an individual control unit 44, 46, 48 which may communicate with the central control unit 38. The fine blanking system further comprises a feed line 49 comprising a straightener or leveler 50 and a decoiler or cradle 52 from which process material 18, in particular sheet metal 18, is unwound. The fine blanking system furthermore comprises a double disc grinder 56, a deburring device 58, a washing device 60 and a handling and packing robot device 62. As explained above each of the components of the fine blanking system shown in FIG. 4 may comprise one or more of the above explained sensors 36 which collect parameter data and provide the measurement data to the central control unit 38 which on this basis determines and applies adjustments of control parameters, as explained above.

LIST OF REFERENCE NUMERALS 10 press ram
12 working table
13 first press drive
14 press punch
16 die
18 process material
20 feeding unit
22 chopping unit
24, 26 feeding rollers
28, 30 cutters
32 impingement ring
34 press frame
36 sensors
38 central control unit
40, 42 arrows
44, 46, 48 individual control units
50 straightener or leveler
52 decoiler or cradle
56 double disc grinder
58 deburring device
60 washing device
62 robot device
68, 70 cushions
72, 74 transfer pins
76, 78 ejectors
80, 82 set plates
84 press plate
86 tool guiding
100 fine blanking press
102 slave fine blanking press
104 slave conventional press

The invention claimed is:

1. A method for operating a fine blanking system comprising at least one fine blanking press including a first press unit, a second press unit, and a first press drive configured to drive the first press unit against the second press unit in a first driving movement during a fine blanking process step, and one or more sensors, the method comprising: obtaining parameter data from the one or more sensors for at least one of the first press unit, the second press unit, and another component of the fine blanking system during a first fine blanking process step; determining adjustments for control parameters of at least one of the first press unit, the second press unit, and the other component of the fine blanking system based on the parameter data; and applying the adjustments to the control parameters of the at least one first press unit, the second press unit, and the other component of the fine blanking system in a second fine blanking process step subsequent to the first fine blanking process step, wherein the parameter data are collected with the one or more sensors during a multitude of subsequent fine blanking process steps following the first fine blanking process step, wherein the determining of the adjustments of the control parameters is based on an identification of at least one trend in the parameter data, and wherein the at least one identified trend is predicted for at least one subsequent fine blanking process step.

2. The method according to claim 1, wherein at least one of the first press unit and the second press unit comprises at least one of a press ram, a working table, a press cushion, a press plate, and a chopping unit.

3. The method according to claim 1, wherein the other component of the fine blanking system comprises at least one of a press frame component, a control valve, a hydraulic fluid conduit, a power unit, a feeding device, a straightening device, a levelling device, a grinding device, a heat treatment device, a surface treatment device, a press device, a fine blanking press, a parts feeding device, a deburring device, a washing device, a tumbler device, a assembling device, a robotic device, a handling device, a packaging device, a labelling device, and a quality inspection device.

4. The method according to claim 1, wherein the one or more sensors comprises at least one of a position sensor, a pressure sensor, a fluid flow sensor, a gas flow sensor, a viscosity sensor, a sound sensor, a temperature sensor, a velocity sensor, an acceleration sensor, a stroke sensor, a force sensor, a vibration sensor, a frequency sensor, a cleanliness sensor, and a deformation sensor.

5. The method according to claim 1, wherein the determining of the adjustments of the parameter data and the applying of the adjustments of the parameter data are conducted in a closed loop control by a control unit.

6. The method according to claim 5, wherein the control unit receives the parameter data collected by the one or more sensors in real time.

7. The method according to claim 1, wherein at least one of the parameter data and the adjustments of the control parameters are stored in a main database for output to operator personnel.

8. The method according to claim 1, further comprising:
generating a warning signal based on at least one of the parameter data and the adjustments of the control parameters, wherein the warning signal is configured to indicate at least one of a current failure, a predicted future failure, and wear of at least one of the first press unit, the second press unit, and the other component of the fine blanking system.

9. The method according to claim 1, wherein the adjustments of the parameter data comprise at least one of a velocity adjustment, an acceleration adjustment, an adjustment based on an exerted force, an adjustment of a start time of movement, an adjustment of an end time of movement, and an adjustment in moving direction of at least one of the first press unit and the second press unit.

10. The method according to claim 1, wherein the adjustments of the parameter data comprise at least one of an adjustment to production speed, an adjustment to a start time of production, and an adjustment to an end time of production.

11. The method according to claim 1, wherein the first press drive comprises at least one first hydraulic cylinder, and wherein at least one first control valve is configured to connect at least one of a barrel side and a piston side of the at least one first hydraulic cylinder to a tank for hydraulic fluid.

12. The method according to claim 1, wherein at least one first control valve is configured to connect a barrel side and a piston side of at least one first hydraulic cylinder to each other.

13. The method according to claim 11, wherein a pressure in the barrel side and the piston side of the at least one first hydraulic cylinder is one of the control parameters.

14. The method according to claim 13, wherein the second press unit exerts a counter force against the first press unit during at least a part of its first driving movement.

15. The method according to claim 14, wherein the second press unit comprises at least one second press drive including at least one hydraulic cylinder, and wherein at least one second control valve is configured to connect at least one of a barrel side and a piston side of the at least one second hydraulic cylinder to a tank for hydraulic fluid.

16. The method according to claim 15, wherein at least one second control valve is configured to connect a barrel side and a piston side of at least one second hydraulic cylinder to each other.

17. The method according to claim 16, wherein a pressure in the barrel side and a pressure in the piston side of the at least one second hydraulic cylinder is one of the control parameters.

18. The method according to claim 1, wherein at least one initial fine blanking process step carried out before the first fine blanking process step, and wherein the at least one initial fine blanking process step is carried out without material to be fine blanked fed to the at least one fine blanking press.

* * * * *